United States Patent

[11] 3,610,357

[72] Inventors William J. Neal
Manvel;
Joseph H. Rosenbaum, Houston; Thomas F. Vining, Houston, all of Tex.
[21] Appl. No. 833,571
[22] Filed June 16, 1969
[45] Patented Oct. 5, 1971
[73] Assignee Shell Oil Company
New York, N.Y.

[54] SEISMIC SOUND SOURCE
3 Claims, 2 Drawing Figs.
[52] U.S. Cl. .................................................. 181/0.5,
181/0.5 NC
[51] Int. Cl. ........................................................ G10k 11/00
[50] Field of Search ........................................... 181/0.5

[56] References Cited
UNITED STATES PATENTS
3,480,101  11/1969  Barry et al. ..................... 181/0.5 NC
3,176,787  4/1965  Roever .......................... 181/0.5 NC Primary Examiner—Rodney D. Bennett, Jr.
Assistant Examiner—H. A. Birmiel
Attorneys—Theodore E. Bieber and J. H. McCarthy ABSTRACT: A seismic source for use in water-covered areas wherein an explosive gas mixture is detonated within a closed chamber having a flexible wall. The gas is contained within a volume formed between a rigid impermeable inner wall and a flexible impermeable outer wall. The products of the detonation are exhausted first to the atmosphere and then into an evacuated chamber before the hydrostatic pressure has completed the inward flexing of the flexible outer wall.

PATENTED OCT 15 1971 3,610,357

INVENTORS:
W. J. NEAL
J. H. ROSENBAUM
T. F. VINING 3,610,357

SEISMIC SOUND SOURCE

RELATED APPLICATION

The present invention is related to copending application entitled "Oval-Flexing Seismic Source," Ser. No. 769,461, filed Sept. 18, 1968.

BACKGROUND OF THE INVENTION

The present invention relates to a seismic impulse source wherein an explosive gas mixture is detonated to provide the seismic impulse. The seismic source is particularly adapted for use in exploring water-covered areas where the source itself is submerged in the water. In U.S. Pat. No. 3,176,787, there is described an explosive gas-type seismic source wherein the gas mixture is introduced into a closed chamber and then detonated. The chamber is so formed that it may freely expand to an internal volume of at least five times its original volume. As explained in the patent, by permitting the chamber to freely expand, the maximum energy of the detonation is converted to useful seismic energy and a minimum of the energy is absorbed in expanding the container.

The above-referenced copending application describes a seismic source using an explosive gas mixture and having a particular system for exhausting the products of the detonation from the flexible-walled container. As explained in the application, in the absence of some means for positively exhausting the detonation products they tend to accumulate and eventually render the source ineffective. More particularly, the application describes a system wherein the flexible-walled container is first exhausted to the atmosphere and then, as the pressure is reduced, exhausted to an evacuated container. The system includes suitable valves and control means to control the timing of the opening of the atmospheric exhaust and the evacuated container to insure that they are open in correlation with the collapse of the flexible container due to the hydrostatic pressure. The system also includes suitable check valves to insure that the explosive gas mixture is not drawn into the flexible container when it is open to the evacuated container.

While the system described in the copending application is successful in solving the problem of exhausting the chamber in which the gas mixture is detonated, problems still exist. More particularly, it has been discovered that the system does not make he most efficient use of the energy available in the exploding gas mixture. It is well known that when a gas mixture is detonated in a flexible-walled container immersed in water, pressure waves are produced as the water is displaced by the expanding gas bubble. The pressure waves create an expanding gas bubble that displaces the surrounding water as it expands. The gas bubble continues to expand until the hydrostatic pressure exceeds the pressure in the bubble and causes the bubble to collapse. When the bubble collapses, the momentum of the water moving inward recompresses the gas which then expands to produce a second shock wave. In general, the useful seismic energy is that radiated from the source during the initial expansion of the gas bubble and additional expansions merely add unwanted reverberations to the impulse.

Thus, the problem is preventing the repeated collapsing and expanding of the gas bubble and insuring that maximum available energy of detonation is converted into useful seismic energy.

SUMMARY OF THE INVENTION

The present invention solves the problem by confining the gas mixture in a small initial volume surrounding a rigid plug. With this configuration it has been discovered that the amount of useful energy radiated from a given mass of gas is significantly greater than that which is radiated from a cylindrical or spherical bubble having no internal plug or structure. Further, it has been discovered that the amount of useful energy that is radiated increases with an increase in the ratio of the volume of the plug to the volume of the bubble.

Utilizing the above discovery, the present invention provides a seismic energy source having a rigid cylindrical core surrounded by a flexible outer tube or sleeve. The gas mixture is introduced into the volume between the rigid inner cylinder and the outer flexible sleeve. When the gas mixture is detonated, the sleeve expands to displace the water and convert the energy of the expanding gas mixture into useful seismic energy in the form of pressure waves in the water surrounding the source.

The exhaust system described in the above copending application is used to exhaust the annular area surrounding the rigid inner cylinder. More particularly, after the gas has expanded to its maximum volume and the bubble has started to collapse, the volume is opened to an atmospheric exhaust. After the major portion of the detonation products have been exhausted to the atmosphere, the volume is opened to an evacuated container which completes the exhausting of the detonation products. After the volume surrounding the inner rigid cylinder has been evacuated, the supply conduit is opened and a new supply of explosive gas mixture supplied to the volume.

BRIEF DESCRIPTION OF THE DRAWINGS

The present invention will be more easily understood from the following detailed description of a preferred embodiment when taken in conjunction with the attached drawings in which.

DESCRIPTION OF A PREFERRED EMBODIMENT

Figure 1:
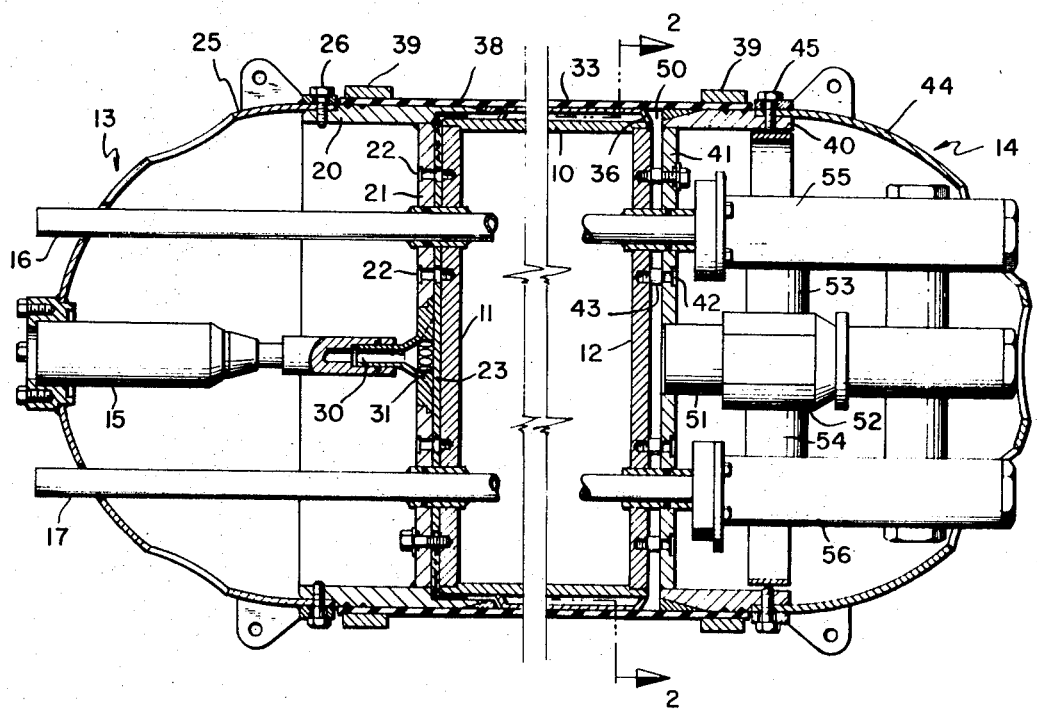
FIG. 1 is a vertical section sound source constructed according to this invention.

As explained above, the present invention embodies the discovery that the efficiency of a seismic sound source using explosive gas mixture can be increased if the gas is confined in an annular space surrounding a rigid inner core. While the invention is specifically described with relation to a cylindrical-type sound source wherein the gas is confined to an annular space surrounding a rigid cylindrical core, it can be readily adapted to a spherical-type source wherein the rigid inner core is in the form of a sphere. The use of a cylindrical inner core is preferable, since the fabrication of both the core and the flexible outer sleeve is extremely simplified. In contrast, fabrication of the spherical shape and outer spherical cover is obviously difficult.

Referring particularly to the drawings the sound source utilizes a rigid, impermeable, cylindrical center section or core 10 having rigid end walls 11 and 12 fastened thereto. More particularly, the end walls can be welded to the ends of the rigid cylinder. Enclosures and fairing pieces 13 and 14 are attached to the opposite ends of the cylindrical center section as more fully described below. The explosive gas mixture is supplied by a conduit 15 located in one endpiece and communicating with the center of the source, while the gases are exhausted through an atmospheric exhaust 16 and exhaust 17 that communicates with evacuated container.

Figure 2:
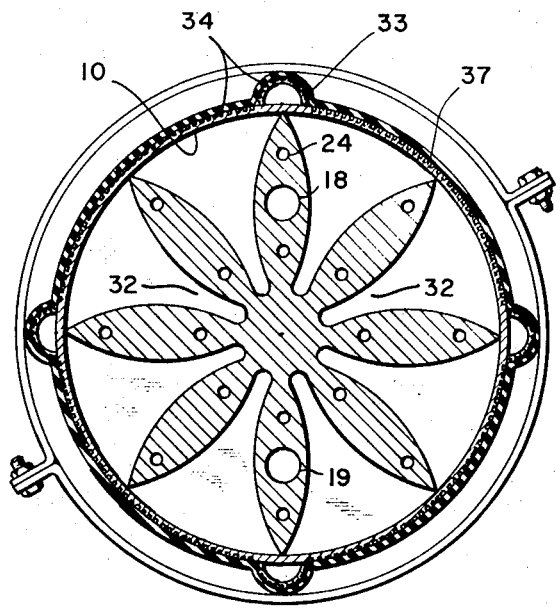
FIG. 2 is a cross section taken along line 2—2 of FIG. 1 and showing the construction of the inner rigid cylinder.

The forward or leading enclosure 13 has a cylindrical portion 20, that is closed at one end by an endpiece 21 that is welded to the cylindrical portion 20. The endpiece 13 is secured to the central tubular secton by means of a plurality of bolts 22 which pass through the end wall 21 and thread into the end wall 11 of the center section. A spacing member 23 is positioned between the end wall 21 of the forward enclosure and the end wall of the central section. As shown in FIG. 2, the spacing member 23 is provided with a series of openings 24 through which the bolts pass and an opening 18 through which the exhaust 16 passes and a second opening 19 through which the exhaust line 17 passes. The opposite end of the tubular section 20 is closed by means of fairing piece 25 which is secured to the tubular section 20 by means of a plurality of bolts 26. Fairing piece 25 may take any desired shape but is used primarily to fair the end of the sound source and permit easier towing of the sound source in water.

Referring specifically to FIG. 2, there is shown a cross section of the cylindrical central section 10. More particularly, the central section is formed from a central cylindrical or tubular member 37 having four semicircular members 33 disposed on its outer surface. In particular, the semicircular members are spaced equally around the outer surface and extend longitudinally along the surface of the tubular member. Both the semicircular members 33 and the tubular member 37 are provided with a plurality of shallow, longitudinal grooves 34 on their outer surfaces. The combination of the semicircular members and the shallow grooves 34 insures that the flexible tubular outer member 38 will not collapse completely about the outer surface of the tubular member 37 and eliminate the annular volume or chamber that surrounds the tubular member. The tubular outer member or sleeve is preferably formed of an impermeable material such as neoprene rubber and is clamped at each end by clamp means 39 to the endpieces 13 and 14, respectively.

The spacing member 23 between the forward end and central section is provided with a plurality of gas passageways 32 which start at the center of the spacing member and extend radially outward. As the passageways extend outward, they increase in cross-sectional area as shown in FIG. 2. As explained below, the explosion or detonation of the gas mixture is initiated at the center of the spacing member and as the flame front travels radially outward, the volume of gas will increase, necessitating a corresponding increase in the cross-sectional area of the gas passageways.

The gas supply conduit 15 is provided with a check valve 30 which prevents backflow of combustion products into the gas inlet conduit. In addition, the gas conduit communicates with a plurality of passageways 31 formed in the endpiece 21. The opposite ends of the passageways 31 communicate with the inner ends of the gas passageways formed in the spacing member. The inner end of the gas supply conduit also includes a suitable means such as a spark plug or the like, not shown in FIG. 1, for detonating the gas mixture.

The aft enclosure 14 also includes a tubular portion 40 having one end closed by an endpiece 41. The enclosure 14 is connected to the cylindrical center section by means of a plurality of bolts 42 which pass through the endpiece and thread into the endpiece 12 of the central section. Spacing members 43 are provided for spacing the end 41 from the central section in order to form an exhaust passageway 50 between the two endpieces. The aft enclosure of the source is also provided with a fairing piece 44 which is coupled to the tubular section 40 by means of a plurality of bolts 45.

The exhaust passageway 50 communicates with an exhaust conduit 51 having a valve means 52 disposed therein. The valve means communicate via a passageway 53 with a valve 55 disposed to control the flow of exhaust gases through the atmospheric exhaust line 16. Similarly, the valve 52 communicates via a passageway 54 with the valve 56 which controls the flow of gases through the exhaust line 17 that communicates with the evacuated chamber. The structural details of suitable valves and their operation are more particularly described and claimed in the above-referenced copending application.

OPERATION

The seismic source described above is operated in substantially the same manner as that described in the copending application. More particularly, a predetermined quantity of an explosive gas mixture is introduced through the supply conduit 15 into the annular space surrounding the rigid cylindrical center section of the source. The gas is then detonated or exploded by initiating a spark adjacent the inlet end of the source. The resulting explosion causes a flame front to travel through the gas mixture and detonate the complete gas mixture. As the gas mixture is detonated, it will expand causing the flexible sleeve 38 to expand radially outward to displace the surrounding liquid or water. This, in turn, will produce a pressure wave in the water which will produce the desired seismic waves. The gas bubbles will continue to expand until the pressure in the gas bubble is less than the hydrostatic pressure of the surrounding water. At this point, the hydrostatic pressure will cause the flexible tubular member 38 to collapse which will force the exhaust gases out to the exhaust passageway 50 and conduit 51 through the various valves that control the exhaust of the system. As explained, the system is designed to utilize the same valving arrangement as that described in the copending application. More particularly, when the hydrostatic pressure starts to collapse the flexible outer sleeve, the valve controlling the flow through the atmospheric exhaust line is opened to permit discharge of the major portion of the products of the detonation to the atmosphere. Prior to the complete collapse of the outer sleeve, the valve means 56 is opened so that the remainder of the detonation products can be exhausted through the exhaust line that communicates with the evacuated chamber. This insures a substantially complete scavenging of the detonation products from the source and prepares the source for a succeeding charge of explosive gas mixture. After the source has been exhausted, a new charge of explosive gas can be introduced and the process repeated.

As explained above, the important feature of the present invention is the use of a rigid, impermeable inner core member surrounded by a flexible, impermeable outer member. In addition, a volume or chamber is provided between the two members so that an explosive gas mixture can be introduced into the volume and detonated. Further, the outer member is provided with sufficient flexibility to permit it to stretch outwardly or flex so that the gas volume can expand to at least several times its original volume.

The above features produce a sound source which is more efficient than that described in the copending application without increasing the cost. Thus, one may either use a smaller quantity of gas or produce a larger seismic impulse using the same quantity of gas. Both cases result in a reduced cost for the seismic impulses produced.

While particular means have been shown for constructing the rigid inner member and for supplying an explosive gas mixture thereto, obviously other constructions could be devised. As explained, spherical members could also be used, although the construction thereof is more difficult than the cylindrical members shown in the drawings and described above. Further, it is possible to use the features of this invention without using the exhaust valve arrangement of the copending application. The detonation products could be exhausted directly to the atmosphere and the incoming gas mixture used to sweep out the remaining detonation products from the source.

We claim as our invention:

1. A seismic sound source for use in water-covered areas, said sound source comprising:

a gas-containing chamber, said chamber including a rigid inner wall formed by a rigid tubular inner member of circular cross section having a plurality of longitudinal grooves formed on its outer surface, and including a flexible outer wall in the form of a flexible tubular outer cover sealed at its ends to said rigid inner member;

supply conduit means disposed along the axis of said tubular member, said supply conduit means communicating with said gas chamber through a plurality of radial passageways to introduce a combustible gas mixture into said chamber, the radial passageways increasing in cross-sectional area as the distance from the supply conduit increases;

an exhaust conduit means, said exhaust conduit communicating with said gas chamber;

firing means for detonating the gas in said gas chamber; and control means responsive to the pressure in said gas chamber to open said exhaust conduit means after said gas has been detonated and before said flexible outer wall collapses on said rigid inner wall.

2. A method of producing seismic impulses within a liquid comprising:
  confining a detonable gas mixture within a region bounded by a rigid inner wall and a flexible outer wall;
  detonating said gas mixture;
  opening the region into a conduit after the detonation has displaced the liquid;
  opening the conduit into an evacuated container before the hydrostatic pressure has completed the collapsing of the flexible wall;
  closing the opening between the annular region and the conduit before closing the opening between the conduit and evacuated container;
  flowing detonable gas into the region after the opening between the region and the conduit is closed;
  closing the opening between the conduit and evacuated chamber; and
  repeating the above steps to produce at least one additional seismic impulse.

3. A seismic sound source for use in water-covered areas, said sound source comprising:
  a gas-containing annular chamber, said chamber being formed by a rigid cylindrical inner wall and a flexible tubular outer wall, the annular chamber providing a combustion chamber exterior to the cylindrical inner wall;
  supply conduit means, said supply conduit means communicating with said annular chamber by radial passageways to introduce a combustible gas mixture into said annular chamber, but not into the space interior of the inner wall, the supply conduit means being much smaller in diameter than the cylindrical inner wall;
  an exhaust conduit means, said exhaust conduit communicating with said annular chamber;
  firing means for detonating the gas in said annular chamber; and
  control means responsive to the pressure in said annular chamber to open said exhaust conduit means after said gas has been detonated and before said flexible outer wall collapses on said rigid inner wall.